May 21, 1940.   W. E. JOOR   2,201,652
STORAGE TANK
Filed May 1, 1937   3 Sheets-Sheet 1

Fig. IIA

Inventor.
William E. Joor
By Williams, Bradbury, McCaleb & Hinkle
Attys.

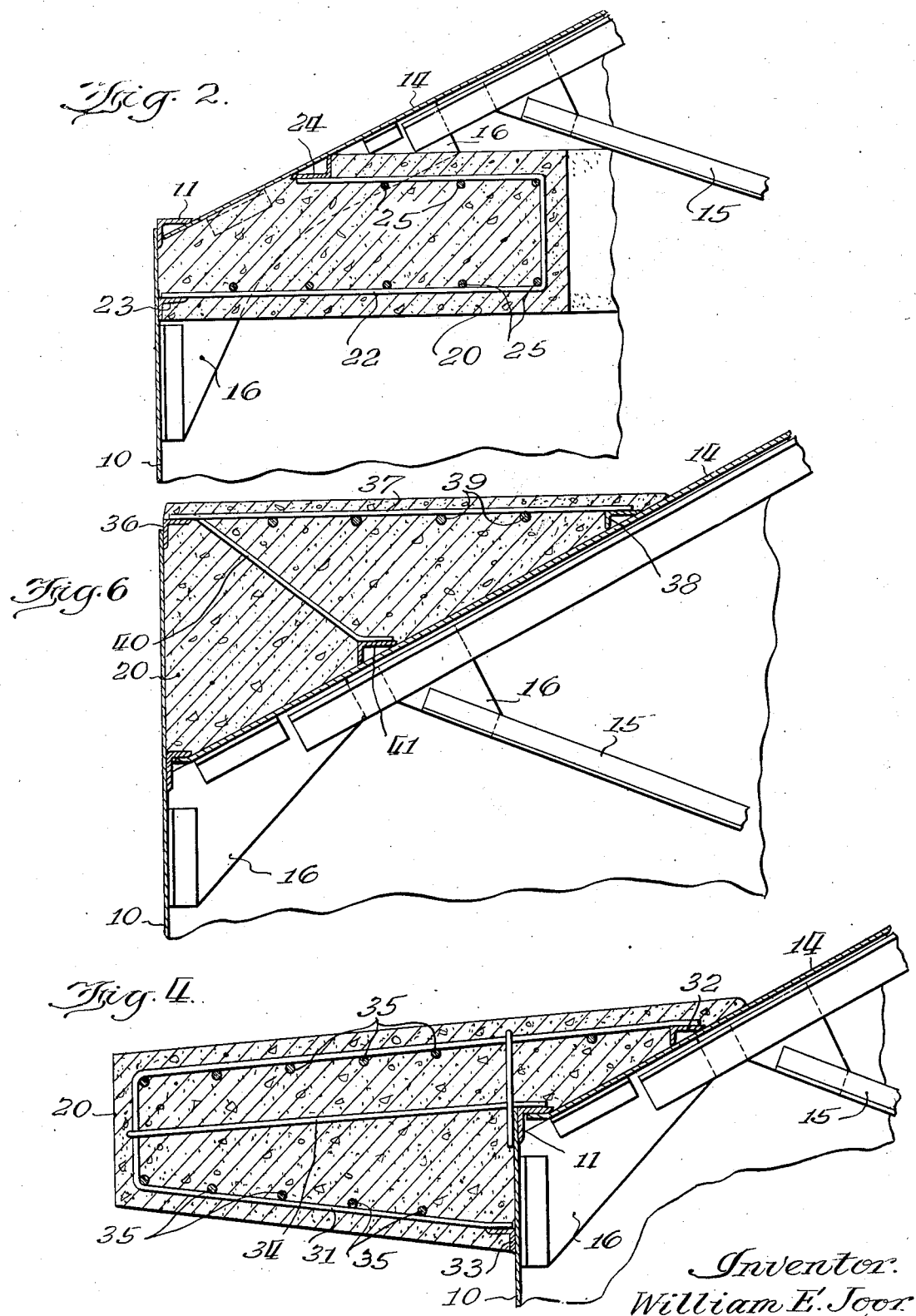

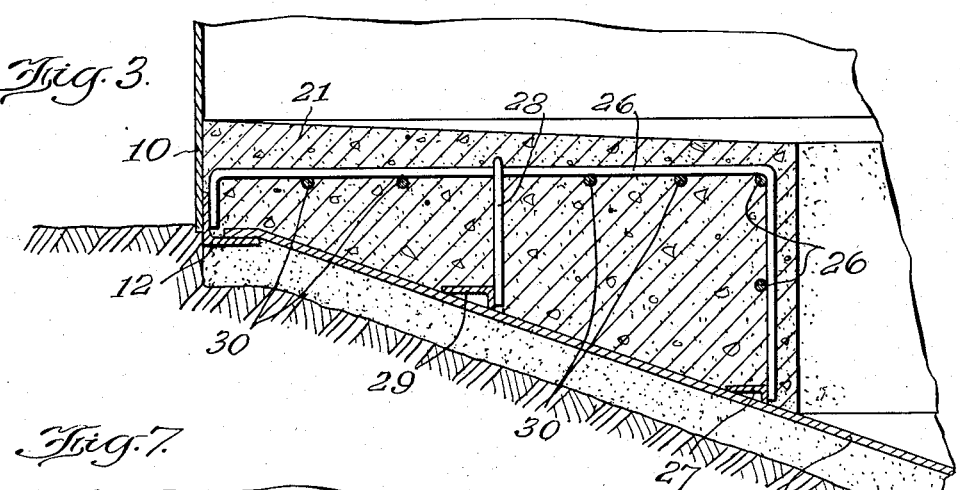
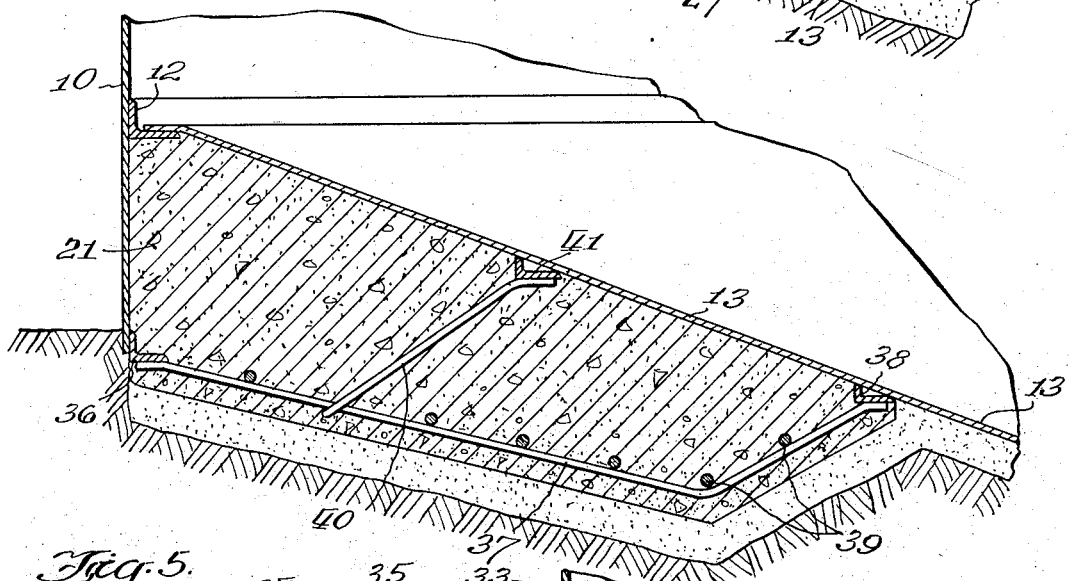
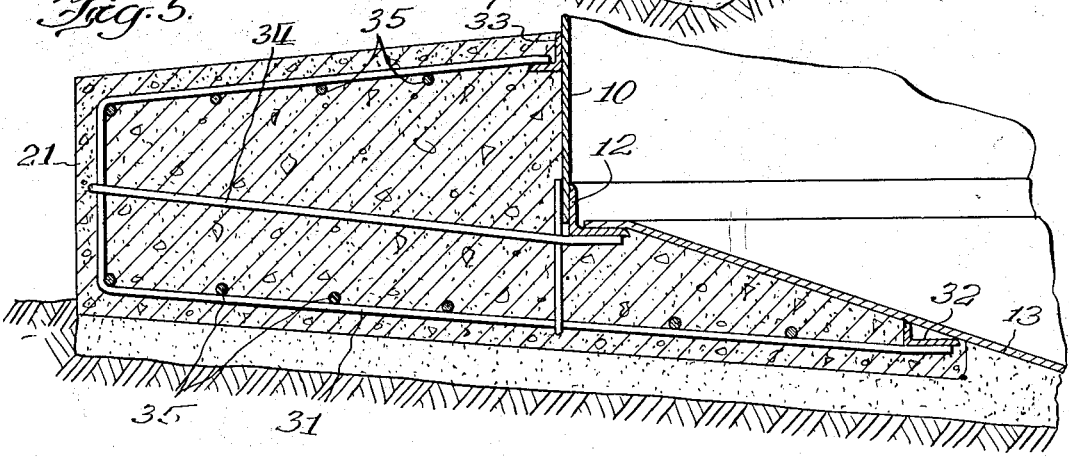

Patented May 21, 1940

2,201,652

UNITED STATES PATENT OFFICE 2,201,652

STORAGE TANK

William E. Joor, Chicago, Ill.

Application May 1, 1937, Serial No. 140,132

7 Claims. (Cl. 220—1)

This invention relates to storage tanks and more particularly to storage tanks of large sizes intended for use in storing petroleum products and other volatile liquids and gases. The invention relates more specifically to tanks capable of withstanding internal pressure due to the vapor pressure or gaseous pressure of the fluid stored within said tanks.

Large tanks of this type present individual problems not met with in smaller tanks. The tanks are usually of substantial size; for example, they may be as large as 25 feet in diameter and they may even be as large as 120 feet or larger in diameter. In the case of a small round structure, very considerable strength is provided by the relatively high curvature of the walls. When the size of the tank becomes considerable, for example, a diameter of 25 feet or over, the curvature is relatively slight and very little strength is derived from the curvature of the wall.

My improved tanks are capable of withstanding considerable internal pressures. They comprise reinforcing elements which are proportioned to resist pressures of the desired degree. The tanks are, of course, provided with relief valves, which prevent the occurrence of excessive pressure differentials. These tanks may be built for storing liquids of various volatilities and also for gas or vapors maintained under pressure.

These tanks, when employed for the storage of volatile liquids such as petroleum products, alcohols and the like, may be adapted for the prevention or the reduction to a low extent, of the so-called "breathing" which is the cause of a considerable waste of national resources.

The improved storage tanks are adaptable to the storage of large quantities of liquids and gases and may be readily adapted to take any desired pressure within a wide range. Furthermore, the tanks can be easily constructed in a manner that is conservative of materials and labor, requiring a minimum of shop work.

In an endeavor to build large tanks which will withstand internal pressure, substantially spherical or egg-shaped tanks have been built. These tanks, however, possess the disadvantage that they need to be shop-fabricated before being sent to the tank location, this being necessitated by the fact that the metal has to be drawn in a press to give the spherical or egg shape to the finished tank. At the same time, the plates must be trimmed to conform to that shape.

I prefer to build my tank from plates which need no shop fabrication and which may be sent direct from the steel mill to the location. I am able to operate in this manner because my tank plates require merely a simple bend in one direction to conform to the shape of my tank. With this end in view I make the main section of my tank substantially cylindrical and I secure the top and bottom to each end of the cylindrical side wall structure. In order to enhance the pressure resistance qualities of my tank, I prefer to make the top and bottom of substantially cone shape so that the top and bottom are connected at an angle to the cylindrical wall structure. I do not intend to be limited to a geometrical conical shape since I may, with a minimum of shop fabrication, make the apical portions of my top and bottom of curved formation.

It will readily be appreciated that when a tank of this general type, that is, a tank including a substantially cylindrical side wall and a top and bottom in substantially transverse relation thereto, is subjected to internal pressure, there is a tendency for the tank to develop a spherical or egg shape. That is, there is a tendency for the juncture of the ends with the cylindrical side wall to decrease in diameter and to move inwardly. According to my invention I provide means which prevents any such movement and prevents the failure of the tank which would result therefrom. I have found that if the cylindrical walls are reinforced at their extremities, no special reinforcement is required for the intermediate portion of the side walls, since the cylindrical shape is sufficient to prevent any tendency for these walls to belly between the reinforcing elements at the ends. If the top and bottom are flat or substantially flat, means need to be provided to prevent excessive bellying. However, by making the top and bottom coned to some extent and providing reinforcing members to hold their junctures with the cylindrical wall immovable, no further reinforcement of the top and bottom is necessary. Of course, it is always necessary to provide adequate support for the top so as to carry the weight thereof and also to withstand any downward pressure which may be applied on rare occasions.

According to the present invention, I provide a novel reinforcing means for my tanks, which enables them to be built to take practically any desired pressure and notwithstanding that they may be of considerable size. It will be understood that the reinforcing members must be proportioned in accordance with the duty expected of them. My preferred reinforcing members take the forms of rings which are capable of withstanding great compressive force. One of these rings is associated with the top and one with the bottom of the cylindrical portion of my tank so that the ends of this portion and the edges of the top and bottom of the tank which are anchored thereto, are held immovable notwithstanding the internal pressure and the resulting tendency of contraction of the tank at or near these junctures.

My compression rings may be located within the tank or outside the tank. I prefer to locate them within the tank because it is easier to anchor them to the tank in operative relation than when the compression rings are outside the tank. The material from which the compression rings are made is very important, because the compressive force which they must take in the case of large tanks and in the case of tanks which are subjected to a substantial internal pressure, may be very high. I prefer to build my compression rings in situ from reinforced concrete, thus utilizing the advantageous properties of concrete and more particularly its ease of installation and its capacity for taking high compression loads.

The invention will be more fully understood with reference to the following description of preferred embodiments thereof, taken in conjunction with the accompanying drawings, in which:

Fig. 2 is a fragmentary sectional detail, on a larger scale, showing the upper reinforcing member;

Fig. 3 is a similar view showing a slightly modified form of the lower reinforcing ring;

Fig. 4 is a fragmentary sectional detail view, similar to Fig. 2, showing a modified form of upper reinforcing ring;

Fig. 4a is a plan view showing the concrete partly in phantom.

Fig. 5 is a view similar to Fig. 4 showing a corresponding lower reinforcing ring, and Figs. 6 and 7 are similar views showing still a further embodiment of my invention.

Figure 1:
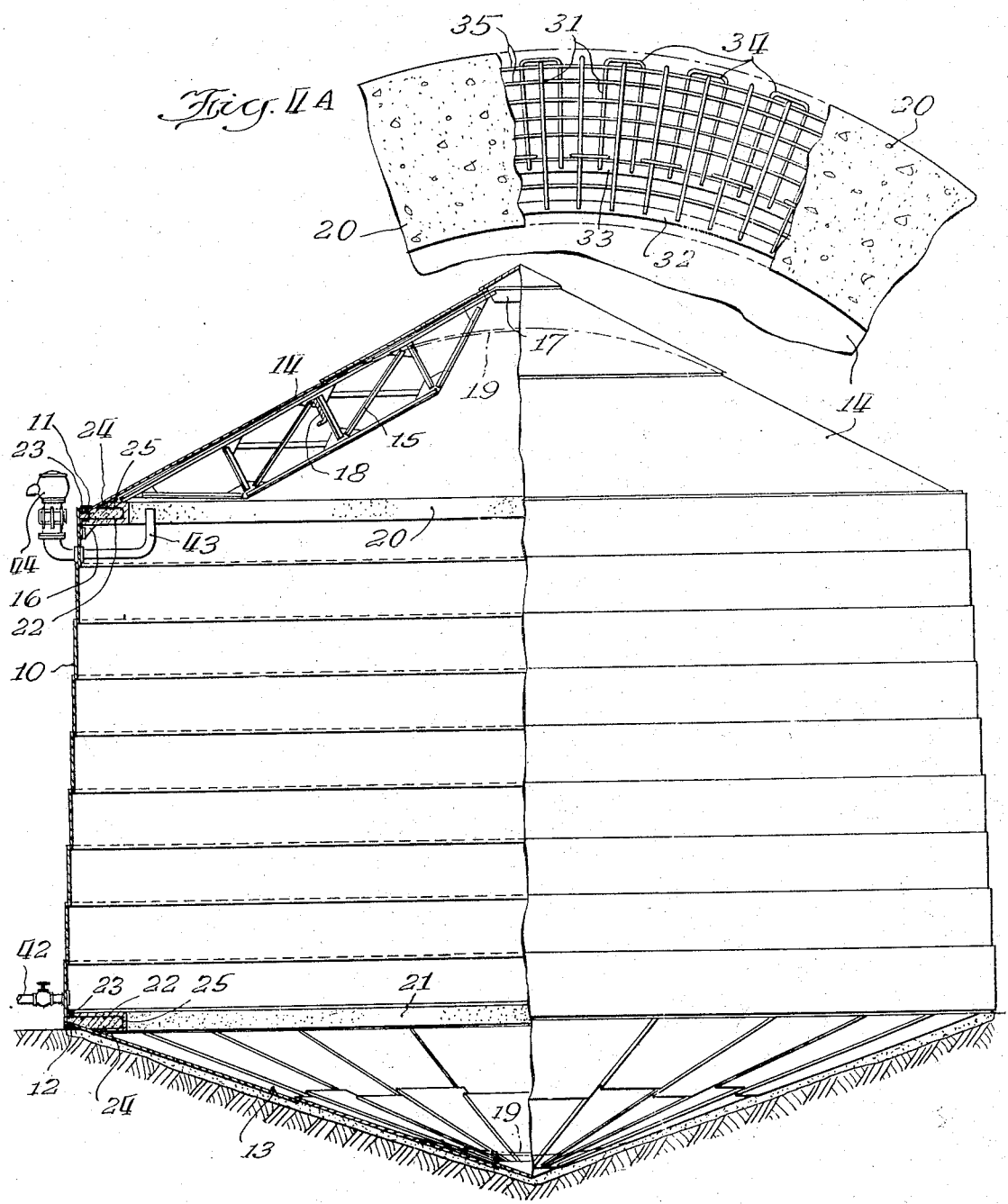
Figure 1 is a sectional view through a tank embodying my invention.

Referring more particularly to Fig. 1, my improved tank may comprise a body portion 10 which is substantially cylindrical in form and is built up from flat plates which are bent in the field in any suitable and convenient manner into the slight curvature required. These plates may be welded together in known manner. At the upper periphery the cylindrical body 10 is provided with an internal annular angle member 11 and at the base a similar annular angle member 12 is provided. The annular angle members 11 and 12 may be secured to the cylindrical body 10 by welding.

The bottom 13 of the tank may suitably consist of a plurality of tapering plates which may be welded together to form a conical bottom. The periphery of the conical bottom rests upon the angle member 12 and may be secured thereto by welding. The roof of the tank may also comprise a conical structure 14 fabricated from plates welded together, which conical structure has its periphery located within the cylindrical wall 10 so that it makes double contact with the angle member 11 to which it may be welded. To take the downward loads to which the roof 14 may be subjected, I provide a suitable substructure which may include trusses 15 supported on the cylindrical wall structure 10 by means of brackets or gusset plates 16. The trusses may suitably form part of a three-hinge arch, each truss member 15 being pivotally connected to one gusset plate 16 and to an apical member 17. Adjacent truss members 15 may be secured together by means of channel members 18 or other suitable structural elements.

It will be noted that I prefer to provide the roof 14 with a greater slope than the bottom 13. This is particularly so in the case of tanks intended to hold liquids. In the case of tanks intended to hold gas under pressure, the pitch of the roof and bottom may be substantially the same. Generally speaking, the more pitched the end wall is, the more resistant is it to internal pressure. In the case of tanks intended to hold liquids, the weight of the liquid and the weight of the tank rests on the bottom so as to provide an additional resistance opposing downward deformation of the bottom by internal pressure.

As suggested by dotted lines in Fig. 1, the top and bottom may be modified slightly so as to eliminate the apical portions and substitute therefor a curved extreme portion 19. This modification involves a relatively small amount of additional shop fabrication. Of course, the roof and the bottom could be made much flatter, but in that event it would be necessary to provide strong reinforcements to prevent bulging when subjected to internal pressure. It is preferred that the top and bottom should make a decided slope to the radial with respect to the cylindrical wall portion 10, since otherwise the distortional force engendered by internal pressure at the ends of the cylindrical body 10, which must be opposed by the annular compression members, would have to be increased in size to take the additional load.

The tank is, of course, provided with suitable valve control conduit means 42 shown at the lower part of Fig. 1, for the supply and withdrawal of fluid. As shown at the upper part of Fig. 1, a suitable vent pipe 43 may be provided which communicates with the interior of the tank, preferably about the level of the periphery of the roof 14 so as to prevent the filling of the tank above the edge of the roof, which is objectionable since the additional liquid head would produce excessive stresses on the roof plates and on the circular ring. This upper vent pipe 43 is provided with a suitable automatic valve 44 whereby pressures above a predetermined amount may be automatically relieved and the valve 44 may open to permit air to pass inwardly through it so as to prevent the occurrence of vacua greater than a predetermined amount within the tank.

It is preferred to provide the compression members 20 and 21 inside the tank, as shown in Fig. 1. While these compression members may be made of any desired material, it is preferred to fabricate them from concrete, the concrete being preferably reinforced. It will readily be understood that the particular dimensions of the compression rings 20 and 21 must depend upon the pressure which the tank is to carry. These rings may be formed in situ. The upper ring 20 may comprise a large number of U-shaped reinforcing rods 22, of which one leg is longer than the other. The lower longer leg is secured to an angle member 23 mounted on the interior of the side wall 10, and the shorter leg of the U-shaped member 22 is secured to an angle member 24 which is rigidly mounted on the under side of the roof 14 adjacent the juncture of the roof with the cylindrical wall 10.

The ring 20 may be formed with the aid of any suitable forms and is firmly anchored to the roof 14 and the cylindrical side wall 10 by the reinforcing members 22. Any suitable number of reinforcing members 22 may be employed, these reinforcing members being located between 4 inches and 8 inches apart all around the circumference of the tank. The ring 20 may also comprise circular rods 25 which may extend completely around the ring 20 or for substantial distances therearound. These rods 25 are suitably wired to the reinforcing members 22. The structure of the ring 20 is shown both in Figs. 1 and 2.

The lower ring 21 is formed in substantially the same way, the reinforcing members 22 being secured to angles 23 on the inner side of the cylindrical wall 10 and to angles 24 secured to the inner side of the bottom 13. The ring 21 may comprise circular or arcuate reinforcing rods 25 just like the ring 20. As best shown in Fig. 3, the lower ring 21 may be modified so that all of its lower face rests on the bottom 13 of the tank.

In this modification the reinforcing members 22 are replaced by reinforcing members 26 which are secured to an angle flange 27 mounted on the inner side of the bottom 13 and to the annular sill member 12 of the tank. In this embodiment of the invention the bottom 13 may be secured exclusively to the horizontal web of the angle member 12. The reinforcement may be supplemented by U members 28. Reinforcing members 28 are provided in transverse relation to the reinforcing members 26. That is, the reinforcing members 28, which are also of U shape, extend in the circumferential direction, being secured to an annular angle member 29 which extends around the bottom 13 of the tank, being located between the annular member 27 and the lower corner of the tank. The reinforcement of the ring 21 may be completed by circumferential or arcuate reinforcing members 30.

In the embodiments of the invention shown in Figs. 4 and 5, the structure of the tank may be substantially similar to that previously described. However, the reinforcing rings 20 and 21 are provided on the exterior of the tank. Since these rings operate by their resistance to compression and since the tendency of the tank is to move inwardly at the opposite ends of the cylindrical portion, when the tank is subjected to excessive pressures, it is necessary to secure the tank to the rings so that the compressive force engendered in the rings holds the corners of the tank against inward displacement.

The attachment of the tank to the rings may be effectively attained by means of the reinforcement of the rings. Thus, as shown in Fig. 4, the ring 20 may include U-shaped reinforcement members 31 which are spaced at frequent intervals in the circumferential direction of the ring. One end of the U-shaped member 31 is secured to an annular angle member 32 secured to the roof 14 of the tank. The other end of the U-shaped member 31 may be welded or otherwise suitably secured to an annular angle member 33 mounted on the exterior of the tank wall 10.

The reinforcing member 31 is preferably located so that it is in the form of a horizontal loop when mounted in position. Other reinforcing members, for example, U members 34, may have their limbs connected to the upper annular members 11. The reinforcing members 34 may be U-shaped and they may lie in a single horizontal plane. They may be wired to the members 31. The reinforcement of the ring 20 may be completed by the annular or arcuate reinforcing members 35. In this case the lower ring 21 is substantially an inverted replica of the ring 20 and various parts thereof are indicated by the same reference numerals, with the exception of the sill 12.

The embodiment of the invention shown in Figs. 6 and 7 will readily be understood from these figures and provides certain advantages over the previously described embodiments.

According to these embodiments the cylindrical wall 10 is extended beyond the point of securement of the roof 14 and bottom 13 to said cylindrical wall and the annular pocket formed between the extension of the wall and the sloping wall of the roof or the bottom, as the case may be, serves as a pocket or receptacle for the formation of the concrete annular ring.

Referring more particularly to Fig. 6, it is to be noted that the upper end of the cylindrical wall 10 carries an angle 36 which is connected by a large number of radial reinforcing rods 37 to an annular angle member 38 which is secured to the roof 14. Further reinforcement is provided by arcuate or circular rods 39 and by oblique rods 40 which are secured to the annular angle member 36 and to an annular angle member 41 mounted on the roof 14.

The annular compression member 21 shown in Fig. 7 is substantially similar to that shown in Fig. 6 but, since it is located at the bottom of the tank, is substantially an inverted replica of that compression ring. It differs from that compression ring in the fact that its bottom line is bent downwardly and is not substantially horizontal, providing greater inner thickness and lesser outer thickness for the ring which may, in some cases, be desirable. Furthermore, the oblique rods 40 do not extend to the annular ring 36 at the end of the cylindrical body 10.

It will be noted that in all cases I have provided an upper compression ring 20 and the lower compression ring 21 which is located at or near the circle of juncture between the roof 14 or the bottom 13 with the cylindrical wall 10. These annular compression members are correlated with the tank structure at these locations so that any tendency for the adjacent portions of the tank to move inwardly is communicated to the rings and is effectively resisted by the compressive strength of the ring.

Although the invention has been disclosed in connection with the specific details of preferred embodiments thereof, it must be understood that such details are not intended to be limitative of the invention except in so far as set forth in the accompanying claims.

Having thus described my invention, what I claim as new and desire to secure by Letters Patent of the United States is:

1. A storage tank capable of resisting high internal gas or vapor pressure comprising a substantially cylindrical body portion, two end closure members having conical marginal portions rigidly anchored around their circumferences to said cylindrical body portion, and a concrete ring supported at each end of said body portion and arranged to be subjected to compression by any force tending to move said ends of the body portion inwardly, whereby any tendency for said ends to move inwardly as a result of high internal pressure is communicated to the ring and resisted by its resistance to compression.

2. A storage tank capable of resisting high internal gas or vapor pressures, comprising a substantially cylindrical body portion, a closure member at each end thereof having conical marginal portions secured to said body portion, and two annular compression members one adjacent each end of said body portion and rigidly secured thereto, said annular compression members being strongly resistant to compression whereby they effectively prevent any inward movement or deformation of the ends of the body portion and the portions of the closure member adjacent thereto, as a result of high internal gas or vapor pressure.

3. In a storage tank capable of resisting high internal gas or vapor pressure, in combination, a substantially cylindrical body portion, an end closure member secured to the body portion in sloping relation, and a compression ring within said tank in cooperative relation thereto adjacent the juncture of the end closure member and the body portion, to prevent inward movement of said juncture owing to high internal pressure.

4. In a storage tank capable of resisting high internal gas or vapor pressure, in combination, a substantially cylindrical body portion, an end closure member secured to the body portion in sloping relation, and a compression ring built up of reinforced concrete and secured to the interior of the tank adjacent the juncture of the end closure member and the body portion, to prevent inward movement of said juncture owing to high internal pressure.

5. A storage tank capable of resisting high internal gas or vapor pressure comprising a substantially cylindrical body portion, substantially conical end closure members rigidly anchored around their circumferences to said body portion at sloping angles, and a reinforced concrete ring supported at each end of said body portion and arranged to be subjected to compression by any force tending to move said ends of the body portion inwardly, whereby any tendency for said ends to move inwardly as a result of high internal pressure is communicated to the ring and resisted by its resistance to compression, said rings being secured by their reinforcements to the body portion and the adjacent end closure member.

6. In a storage tank capable of resisting high internal gas or vapor pressure, in combination, a substantially cylindrical body portion, an end closure thereto having a conical peripheral portion secured to said body portion at some distance inwardly from its end, and a compression ring of concrete formed within the annular chamber thus formed adapted compressively to resist any tendency for the tank adjacent the junction of the body portion and closure member to move inwardly as a result of high pressure within the tank.

7. A storage tank capable of resisting high internal gas or vapor pressure comprising a substantially cylindrical body portion, substantially conical and closure members rigidly anchored upon their circumferences to said body portion at sloping angles, and a reinforced concrete ring supported at each end of said body portion and arranged to be subjected to compression by any force tending to move said ends of the body portion inwardly, whereby any tendency for said ends to move inwardly as the result of high internal pressure is communicated to the ring and resisted by its resistance to compression, each of said rings extending over adjacent portions of the cylindrical body and the conical end members.

WILLIAM E. JOOR.